United States Patent

Higuchi et al.

[11] Patent Number: 4,635,963
[45] Date of Patent: Jan. 13, 1987

[54] SEAT BELT DEVICE

[75] Inventors: Kazuo Higuchi; Hisakazu Okuhara, both of Tochigi; Kiichi Sasaki, Saitama, all of Japan

[73] Assignee: Honda Giken Kogyo Kabushiki Kaisha, Tokyo, Japan

[21] Appl. No.: 856,864

[22] Filed: Apr. 24, 1986

Related U.S. Application Data

[63] Continuation of Ser. No. 578,589, Feb. 9, 1984, abandoned.

[30] Foreign Application Priority Data

Feb. 9, 1983 [JP] Japan ................... 58-20468

[51] Int. Cl.$^4$ .................................. B60R 21/10
[52] U.S. Cl. .................................... 280/801
[58] Field of Search ............. 280/801, 802, 804, 807, 280/808; 297/481, 482, 483, 486

[56] References Cited

U.S. PATENT DOCUMENTS

| | | | |
|---|---|---|---|
| 3,570,621 | 3/1971 | Hampton | 280/801 |
| 4,084,841 | 4/1978 | Hayashi et al. | 280/802 |
| 4,213,637 | 7/1980 | Mauron | 280/802 |
| 4,372,580 | 2/1983 | Motonami et al. | 280/808 |

FOREIGN PATENT DOCUMENTS

| | | | |
|---|---|---|---|
| 2302541 | 7/1974 | Fed. Rep. of Germany | 280/801 |
| 2710754 | 9/1977 | Fed. Rep. of Germany | 297/481 |
| 2730081 | 1/1979 | Fed. Rep. of Germany | 280/801 |
| 3137320 | 4/1983 | Fed. Rep. of Germany | 280/801 |

Primary Examiner—John J. Love
Assistant Examiner—Ross Weaver
Attorney, Agent, or Firm—Lyon & Lyon

[57] ABSTRACT

A seat belt device having a seat belt one end of which is moved back and forth by a lever. The other end of the seat belt is connected to a retractor mounted on the vehicle body, and the intermediate portion of the seat belt is loosely fitted through a hanger mounted on the vehicle body. A tongue plate is carried on the seat belt and engageable with a buckle attached to a seat for fastening the seat belt. When the door is opened, the seat belt is moved rearward by the lever to allow a passenger to get in and off the vehicle with ease. When the door is closed, the seat belt is moved forward by the lever to permit a passenger on the seat to catch the seat belt easily. When the lever is moved into the forward position, its distal end is located above an upper surface of a seat bottom, forward of a front surface of a seat back, and below a straight line passing through a front end of the upper surface of the seat bottom and an upper end of the front surface of the seat back.

18 Claims, 17 Drawing Figures

SEAT BELT DEVICE

This application is a continuation of application Ser. No. 578,589, filed Feb. 9, 1984 now abandoned.

BACKGROUND OF THE INVENTION

1. Field of the Invention

The present invention relates to a seat belt device, and more particularly a seat belt device for maintaining a seat belt in a position rearward of a seat when a passenger gets into or off an automobile and for moving at least a portion of the seat belt to a position forward of the seat when the seat belt is to be fastened by the passenger.

2. Description of the Prior Art

Various safety seat belts have heretofore been proposed and used for holding passengers on vehicle seats for safety against collision with some solid object in the vehicle. One type of such safety seat belt is known as a three-point seat belt or a combination lap and shoulder belt. The three-point seat belt comprises a belt having one end fixed to an inner wall of a vehicle compartment at a relatively high position and an opposite end fixed to the inner wall at a relatively low position. The belt includes a tongue plate attached to an intermediate portion thereof and held in engagement with a buckle located on the side of a seat remote from the inner wall of the vehicle compartment. In use, the upper portion of the belt above the tongue plate serves to support a shoulder of a passenger sitting on the seat, while the lower belt portion below the tongue plate holds the waist of the passenger. The three-point seat belt can provide greater safety than a two-point seat belt which maintains a passenger with a single belt extending obliquely across the body of the passenger.

The ends of three-point seat belt are usually fastened to the vehicle inner wall near the center pillar. This presents a problem in that the belt cannot easily be caught by a passenger when the belt is to be fastened. A three-point seat belt device which is designed for eliminating the drawback is disclosed in Japanese Laid-Open Utility Model Publication No. 56624/1978. According to this seat belt system, a hook is attached to an upper end of a seat back near the inner wall of the vehicle compartment, and the tongue plate on the belt is left in engagement with the hook when not in use.

This seat belt device allows the belt to be caught with ease. However, where the seat belt system is installed in a two-door automobile having rear seats, passengers have to be particularly careful with the seat belt when getting on or off the rear seat, a process of which is quite awkward.

There has been proposed also the type of seat belt devices having a lever swingably connected to a vehicle body, a belt having a lower end thereof fixed to the movable end of the lever, and a retractor for winding the other end of the belt. When a passenger is to get on or off a rear seat, the lever is swung out of the way. One such seat belt device is disclosed in Japanese Laid-Open Utility Model Publication No. 121020/1977. In this seat belt device, a swingable lever is pivotally mounted on a vehicle body behind a front seat near a door, and a wire is fastened at one end to a lower end of the back of the seat and at the other end to the swingable lever. When a passenger get on or off a rear seat, the back of the front seat is turned down forward so that the wire pulls the lever to move rearward. Thereby the belt is moved to a position along the center pillar to permit the passenger to get easily on or off the rear seat. Upon return of the front seat back to a normal position, the lever is angularly moved forward under the force of a spring attached thereto so that the movable end of the lever, to which the lower end of the belt is connected, is moved to be positioned directly laterally with the front seat back. Although this seat belt device permits passengers to get on or off the rear seats uninterruptedly, it fails to give a front-seat passenger easy access to the belt for fastening the same. Indeed, it is preferable for this purpose that the movable end of the lever, to which the belt is attached, should be moved to be positioned directly laterally with a passenger's body on a front seat or forward of such a lateral position rather than being positioned directly laterally with the front seat back. However, this seat belt device cannot meet such a requirement since if the end of the lever were located at a preferable position above, the lever would prevent the passenger from being seated on the front seat, and the front seat back sould be turned forward in order to move the lever out of such position.

The present invention has been devised to provide a seat belt device designed to meet various demands simultaneously, that is, to allow passengers to get easily on and off rear seats in two-door automobiles, to permit a passenger to catch a seat belt when it is to be fastened, and to allow a passenger to be seated on a front seat easily and unobstructedly.

SUMMARY OF THE INVENTION

According to the present invention, a seat belt device for a seat of a vehicle comprises a seat belt, a retractor mounted on the inner wall of the vehicle body for winding up the seat belt, a hanger mounted on the vehicle body and above the retractor, and a lever connected one end thereof to a part of the vehicle body swingably in the back-and-forth direction with respect to the vehicle body. The seat belt has a first end thereof coupled to the retractor, a second end thereof connected to a movable end of the lever, and an intermediate portion thereof loosely inserted through the hanger. A tongue plate is carried on the seat belt between the second end and the intermediate portion. The tongue plate and a buckle attached to a seat jointly constitute a fastener. The seat belt device also includes a drive means for driving the lever to move between a relatively forward first position and a relatively rearward second position. The drive means is actuatable in response to opening and closing movement of the door such that the lever is prevented from moving into the first position unless the door is closed and from moving into the second position unless the door is open. when the lever is in the first position, the movable end of the lever is located above an upper surface of the seat bottom, forward of a front surface of the seat back, and below a straight line passing through a front end of the upper surface of the seat bottom and an upper end of the front surface of the seat back.

Accordingly, it is the object of the present invention to provide a seat belt device for allowing passengers to get easily on and off rear seats in two-door vehicles for permitting a passenger to catch a seat belt when it is to be fastened, and for allowing a passenger to be seated on a front seat easily and unobstructedly.

The above and other objects, features and advantages of the present invention will become more apparent from the following description when taken in conjunc-

DESCRIPTION OF THE PREFERRED EMBODIMENTS

Figure 1:
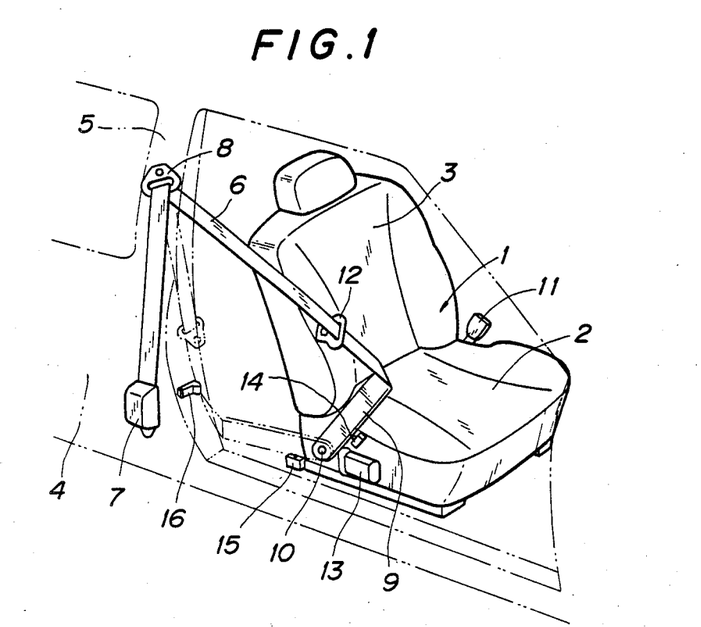
FIG. 1 is a perspective view of a seat belt device according to a first embodiment of the present invention.

FIG. 1 shows a seat belt device according to a first embodiment of the present invention, the seat belt device being shown as being installed in a compartment in a two-door automobile. The compartment has therein a front seat 1 composed of a seat bottom 2 and a seat back 3. A retractor 7 for winding up a seat belt 6 is attached to an inner wall of an automobile body 4 in the compartment under a center pillar 5. The seat belt 6 is unreeled from the retractor 7 and extends through a hanger 8 attached to an inner surface of the center pillar 5. The seat belt 6 has a distal end disposed in and fastened to a belt holder case 9 serving as a swingable lever.

The belt holder case 9 has a sufficient rigidty for moving the seat belt 6 on its distal end. The belt holder case 9 is pivotally mounted by a shaft 10 attached to an outer side of the seat bottom 2 at its rear end portion, the belt holder case 9 being swingably movable back and forth with respect to the seat 1 about the shaft 10. A buckle 11 is mounted on a side of the seat bottom 2 remote from the belt holder case 9. The seat belt 6 can be fastened over a passenger sitting on the seat 1 by putting a tongue plate 12 attached on an intermediate portion of the belt 6 is engagement with the buckle 11.

The belt holder case 9 can be angularly moved back and forth by a motor 13 fixed to the side of the seat bottom 2. When the belt holder case 9 is in a front limit angular position (shown by the solid lines in FIG. 1), the distal end of the belt holder case 9 is positioned above the upper surface of the seat bottom 2, forward of the front surface of the seat back 3, and below a straight line passing through a front end of the upper surface of the seat bottom 2 and an upper end of the front surface of the seat back 3. When the belt holder case 9 is in a rear limit angular position (shown by the imaginary lines in FIG. 1), the belt holder case 9 lies substantially at the level of a floor of the automobile body 4. A limit switch 14 is mounted on the side of the seat bottom 2 at a position in which it is switched by the belt holder case 9 as it is moved to the front limit angular position. Another limit switch 15 is mounted on the automobile floor in a position in which it is switched by the belt holder case 9 as it is in the rear limit angular position. A door switch 16 is mounted on an edge of a door opening in the automobile body 4.

Figure 2:
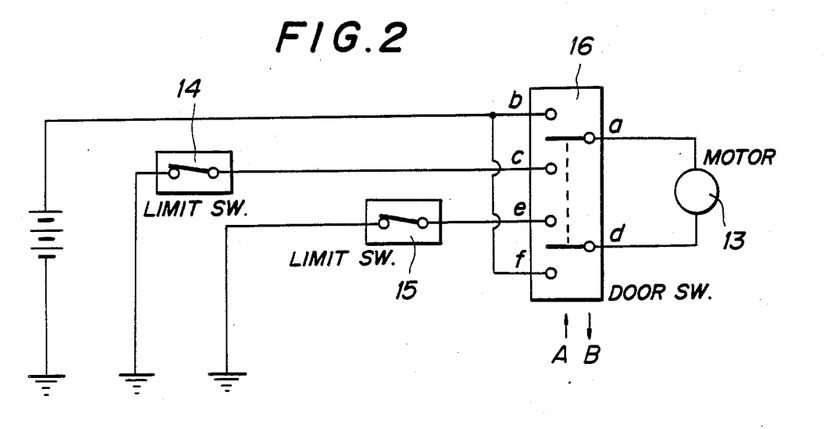
FIG. 2 is a circuit diagram of a circuit arrangement in the seast belt device shown in FIG. 1.

As shown in FIG. 2, each of the limit switches 14, 15 comprises a normally-closed two-terminal, or single-pole single throw, switch having two positions, or open and closed positions. The door switch 16 comprises a two-circuit six-terminal switch selectively movable into first and second positions, and has three terminals a, b, c constituting one circuit and the other three terminals d, e, f constituting the other circuit. When the door switch 16 is in the first position, the terminals a and d are interconnected with the terminals b and e, respectively, while the terminals a and d are disconnected from the terminals c and f, respectively. When the door switch 16 is in the second position, the terminals a and d are interconnected with the terminals c and f, respectively, while the terminals a and d are disconnected from the terminals b and e, respectively.

The limit switches 14, 15, the door switch 16, and the motor 13 are wired to constitute a circuit. More specifically, the terminals a and d of the door switch 16 are connected to a pair of lead wires of the motor 13. The terminals b and f are connected commonly to one terminal of a power supply. The terminal c is connected to ground through the limit switch 14, and the terminal e is connected to ground through the limit switch 15. The other terminal of the power supply is directly grounded.

The circuit arrangement shown in FIG. 2 enables the belt holder case 9 to be angularly moved back and forth in coaction with opening and closing movement of the door. More specifically, when a passenger opens the door to get into the automobile, the door switch 16 is shifted in the direction of the arrow A into the first position. The motor 13 is now energized to rotate, and the rotative power form the motor 13 is transmitted through a transmission mechanism (not shown) to the belt holder case 9 to start moving the belt holder case 9 backward from the front limit angular position (solid-line position). When the belt holder case 9 reaches the rear limit angular position (imaginary-line position), the limit switch 15 is opened thereby to de-energize the motor 13, therby stopping the the belt holder case 9 in the rear limit angular position. When the door is closed after the passenger has got into the automobile, the door switch 16 is shifted in the direction of the arrow B into the second position. The motor 13 is now reversed to turn the belt holder case 9 forward into the front limit angular position. Upon arrival at the front limit angular position, the limit switch 14 is opened by the belt holder case 9 to de-energize the motor 13. The belt holder case 9 is then stopped in the front limit angular position.

Figure 3:
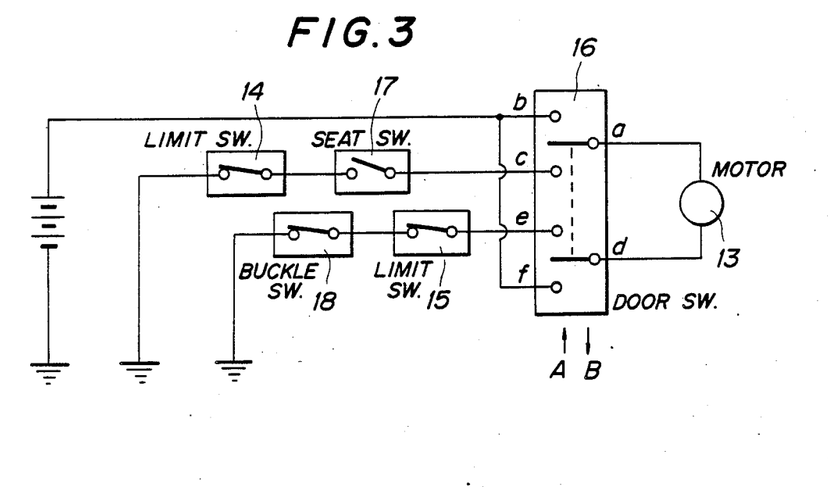
FIGS. 3 through 5 are circuit diagrams of circuit arrangements in modifications of the seat belt device illustrated in FIG. 1.
Figure 4:
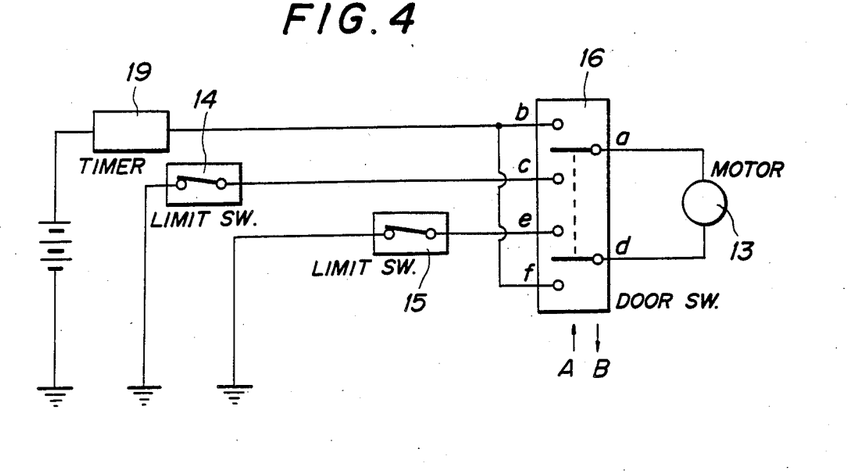
Figure 5:
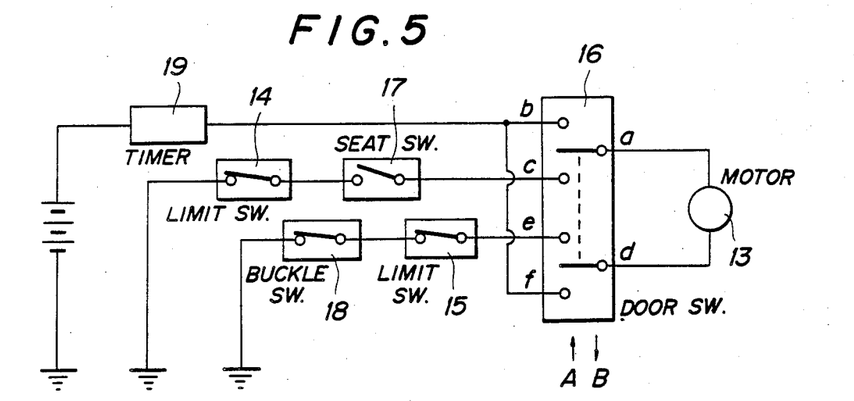

FIGS. 3 through 5 illustrate various modifications in which switches and a timer are added individually or in combination to the circuit arrangement according to the first embodiment shown in FIG. 2. As shown in FIG. 3, a normally-open two-terminal seat switch 17 is connected in series with the limit switch 14. The seat switch 17 is closed when a passenger sits on the seat in which the seat switch 17 is incorporated, and is open otherwise. A two-terminal buckle switch 18 is connected in series with the limit switch 15. The buckle switch 18 is open when the buckle 11 and the tongue plate 12 are held in engagement with each other, and is closed otherwise. As illustrated in FIG. 4, a timer 19 is connected in series with the power supply and will be actuated to turn off the power supply when the motor 13 has been energized continuously beyond a preset period of time.

In the modified circuit arrangement shown in FIG. 5, the seat switch 17, the buckle switch 18, and the timer 19 are all added for combined operation. More specifically, the circuit for energizing the motor 13 to turn the belt holder case 9 backward includes an AND gate composed of the door switch 16 and the buckle switch 18. The AND gate will be opened to complete the circuit only when the door is open and the buckle 11 is released of engagement with the tongue plate 12. Therefore, if the belt 6 is fastened over the passenger and the tongue plate 12 engages the buckle 11, the belt holder case 9 will not be turned backward even when the door is opened. The circuit for energizing the motor 13 to turn the belt holder case 9 forward includes an AND gate composed of the door switch 16 and the seat switch 17. The AND gate will be opened to complete the circuit only when the door is closed and the passenger is seated on the seat. As a consequence, if the passenger is not seated on the seat, the belt holder case 9 will not be turned forward even when the door is closed.

Figure 6:
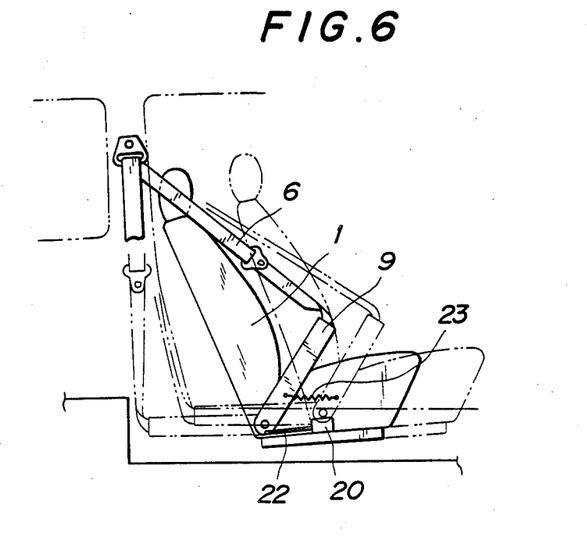
FIG. 6 is a side elevational view of a seat belt device according to a second embodiment of the present invention.
Figure 7:
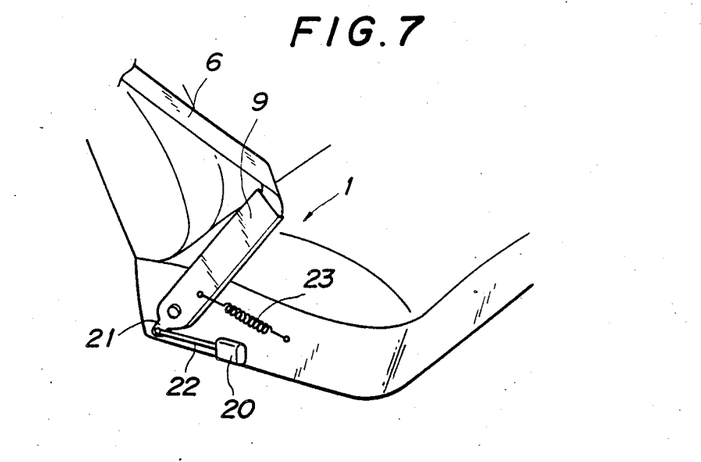
FIG. 7 is a fragmentary perspective view of the seat belt device shown in FIG. 6.
Figure 8:
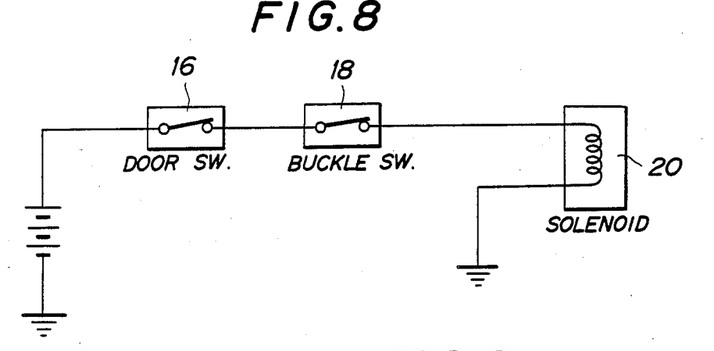
FIG. 8 is a circuit diagram of a circuit arrangement in the seat belt device of FIG. 6.

FIGS. 6 through 8 illustrate a seat belt device according to a second embodiment of the present invention. A belt holder case 9 is pivotally movable by a solenoid 20 and a spring 23. More specifically, the belt holder case 9 has an end pivotally connected to a rear side portion of a seat 1 which is slidable back and forth. The pivoted end of the belt holder case 9 has a projection 21 (FIG. 7) to which a plunger 22 of the solenoid 20 is connected. The solenoid 20 is fixed to the side of the seat 1. The bent holder case 9 is normally urged in the forward direction by the spring 23 acting and kept taut between an intermediate portion of the belt holder case 9 and the side of the seat 1. A circuit arrangement shown in FIG. 8 includes a two-terminal door switch 16 which will be closed and opened when the door is opened and closed, respectively, and a buckle switch 18 which is the same as that shown in FIGS. 3 and 5. The door switch 16 and the buckle switch 18 are connected in series with the solenoid 20, and the series-connected door switch 16, buckle switch 18, and solenoid 20 are connected across a power supply.

In operation, only when the door is opened and the buckle is released, the switches 16, 18 are closed to energize the solenoid 20 to pull in the plunger 22, thereby turning the belt holder case 9 backward against the resilient force of the spring 23. Upon closing of the door after a passenger has got into the automobile, the door switch 16 is turned off to de-energize the solenoid 20, whereupon the belt holder case 9 is turned forward under the resiliency of the spring 23 to bring the belt into a position in which it can easily be caught by the passenger.

Various conditions may be selected for the belt holder case 9 to be turned. In order for the belt holder case 9 to be able to turn backward, at least the condition that the door is opened should be met, and in order for the belt holder case 9 to be able to turn forward, at least the condition that the door is closed should be met.

Figure 9:
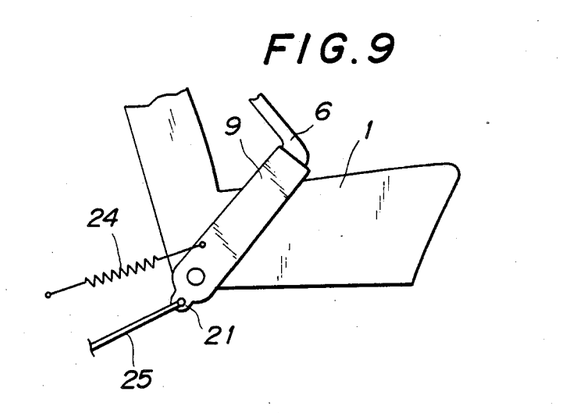
FIG. 9 is a fragmentary side elevational view of a seat belt device according to a third embodiment of the present invention.
Figure 10:
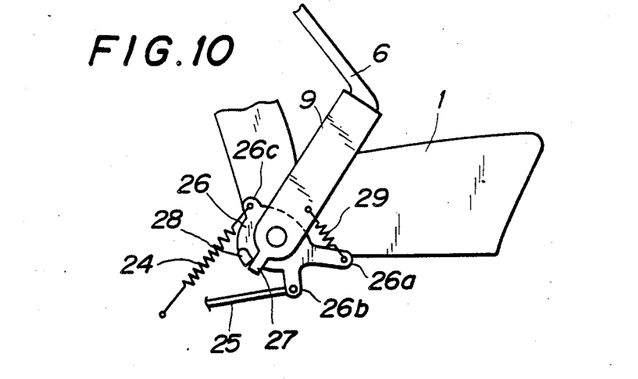
FIG. 10 is a fragmentary side elevational view of a seat belt device according to a fourth embodiment of the present invention.

FIGS. 9 and 10 fragmentarily show seat belt devices according to third and fourth embodiments of the present invention. In the third and fourth embodiments, a belt holder case 9 can be angularly moved in mechanical coaction with opening and closing movement of a door. According to the third embodiment shown in FIG. 9, a belt holder case 9 is pivotally mounted at one end to a rear side portion of a seat 1, and is normally urged backward by a spring 24. The pivoted end of the belt holder case 9 has a projection 21 to which there is connected an end of a control wire 25 having an opposite end linked to the door. A rod may be used instead of the wire 25. When the door is opened, the wire 25 is loosened to allow the belt holder case 9 to turn rearward under the tensioning force of the spring 24. Conversely, when the door is closed, the belt holder case 9 is pulled by the wire 25 to turn forward.

According to the fourth embodiment shown in FIG. 10, a control link 26 is pivotally mounted on a shaft on which a belt holder case 9 is pivotally mounted. The control link 26 has a first radial projection 26a extending substantially in the forward direction, a second radial projection 26b extending substantially in the downward direction, and a third radial projection 26c extending substantially rearward direction. The control link 26 also has an engagement projection 28 disposed between the second and third projections 26b, 26c and engageable with an engagement projection 27 on a lower end of the belt holder case 9. A spring 29 acts and is kept taut between the first projection 26a and a portion of the belt holder case 9 which is located upwardly of the pivot shaft of the belt holder case 9. The engagement projection 28 of the control link 26 and the engagement projection 27 of the belt holder case 9 are normally held in engagement with each other under the tension of the spring 29 so as to enable the integral rotation of the control link 26 and the belt holder case 9. A control wire 25 has one end coupled to the second projection 26b of the control link 26 and an opposite end linked to a door. The wire 25 may be replaced with a rod. The third projection 26c of the control link 26 is normally urged to move downwardly under the force of a spring 24 with one end thereof connected to the third projection 26c. Operation of the seat belt device shown in FIG. 10 is as follows: When the door is opened, the wire 25 is loosened to allow the control link 26 to turn under the tension of the spring 26 and also allow the belt holder case 9 to turn with the control link 26 in the rearward direction. When the door is closed, the control link 26 is pulled by the wire 25, and the belt holder case 9 is allowed to turn forward. When the door is abruptly closed, the spring 29 is elongated to absorb a portion of the force with which the belt holder case 9 is turned forward by the wire 25. Therefore, the mechanism shown in FIG. 10 gives the belt holder case 9 a dampening motion when the door is quickly closed.

Figure 11:
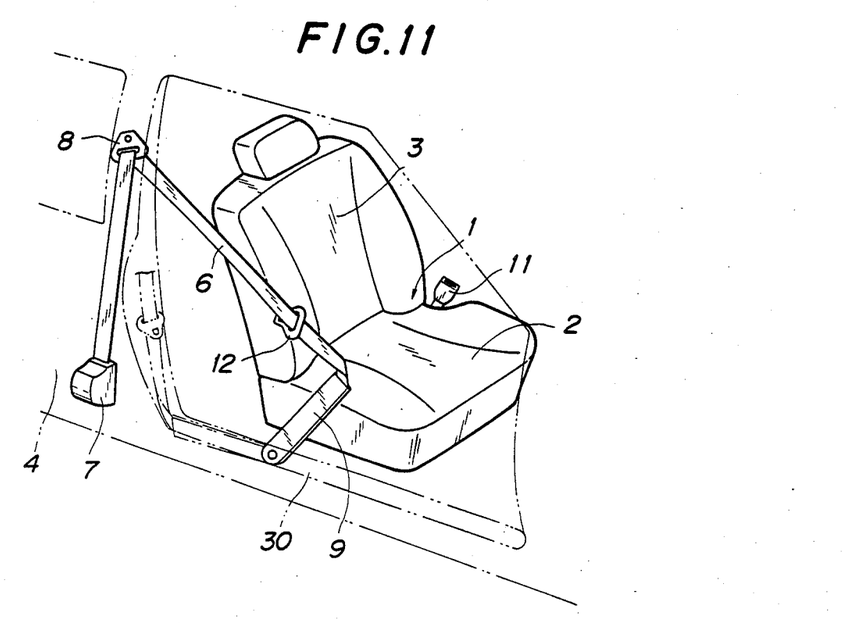
FIG. 11 is a perspective view of a seat belt device according to a fifth embodiment of the present invention.
Figure 12:
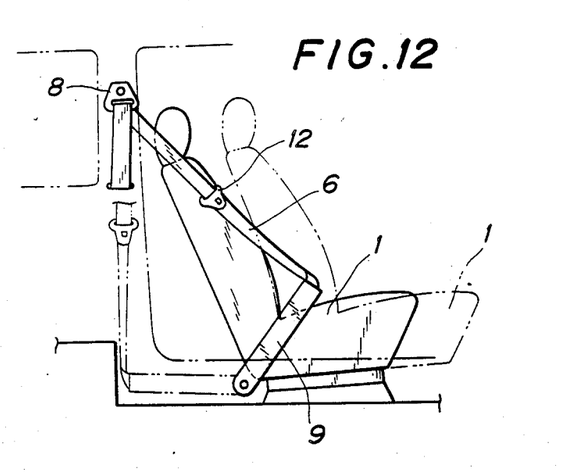
FIG. 12 is a side elevational view of the seat belt device shown in FIG. 11.

FIGS. 11 and 12 are illustrative of a seat belt device according to a fifth embodiment of the present invention. While in the first through fourth embodiments the end of the belt holder case 9 is swingably mounted on the side of the seat bottom 2, according to the fifth embodiment, a belt holder case 9 is pivotally mounted on one end to an inner side of a side sill 30 of an automobile body 4. As shown in FIG. 12, a seat 1 is slidable back and forth. When the seat 1 is slidably adjusted to be in the rearmost position, the belt holder case 9, as it is in the front limit angular position, has an upper end located above the upper surface of the seat bottom 2, forward of the front surface of the seat back 3, and below a straight line passing through a front end of the upper surface of the seat bottom 2 and an upper end of the front surface of the seat back 3.

Figure 13:
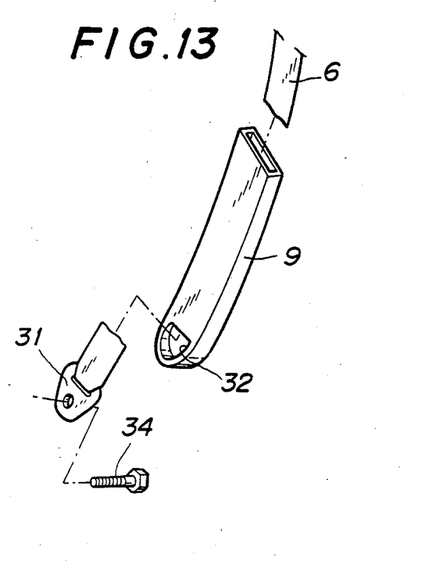
FIG. 13 is a perpsective view of a lever in the seat belt devices according to the embodiments of the invention.

FIG. 13 shows the belt holder case 9 employed as the lever in each of the preceding embodiments. The belt holder case 9 is made of plastic material having a sufficient rigidity for moving the seat belt 6 on its distal end. The belt holder case 9 is in the form of a hollow sheath in which the distal end of the seat belt 6 is inserted, and has an opening 32 defined in its pivoted end portion. A terminal connector 31 to which the distal end of the seat belt 6 is fastened is set in the opening 32. The belt holder case 9 is pivotally mounted on the side of the seat by a bolt 34 extending through the terminal connector 31 into the side of the seat.

Figure 14:
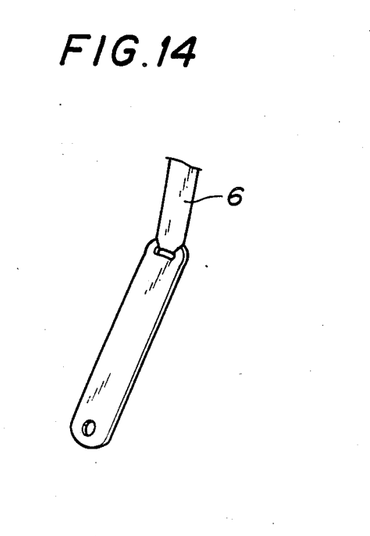
FIGS. 14 through 16 are perspective views of modified designs of the lever shown in FIG. 13.
Figure 15:
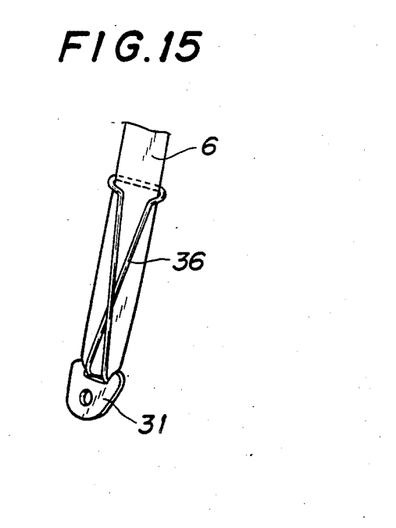
Figure 16:
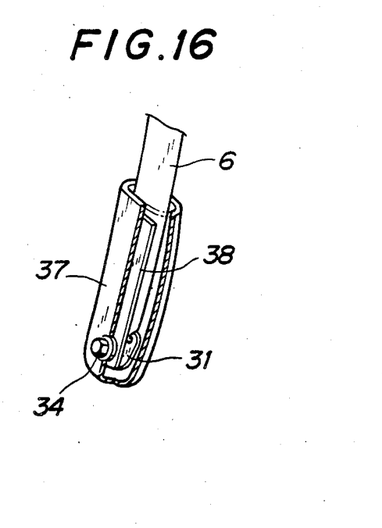

FIGS. 14 through 16 show various modified designs of the lever that can be used in the embodiments of the present invention. A lever shown in FIG. 14 is in the form of a single plate having one end to which the distal end of the seat belt 6 is attached. A lever illustrated in FIG. 15 comprises a resilient wire 36 fixed to a terminal connector 31 of the seat belt 6. A lever shown in FIG. 16 comprises, in combination, a flexible tube 37 of plastic material and a rigid plate 38 of plastic material or metal housed in the flexible tube 37, the seat belt 6 being connected by a terminal connector 31 and a bolt 34 to the tube 37 and the plate 38.

Figure 17:
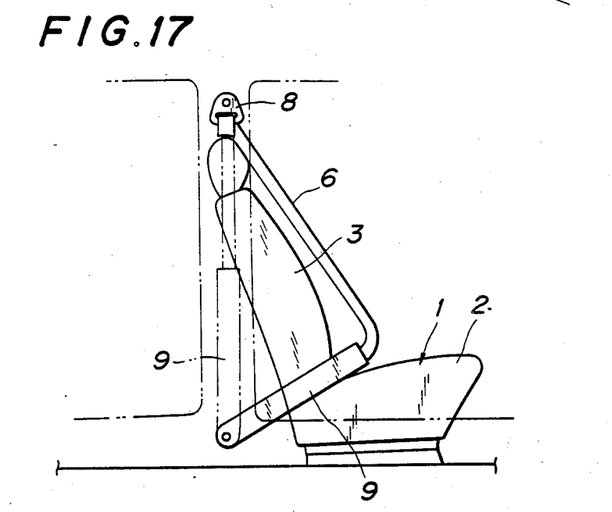
FIG. 17 is a side elevational view of a seat belt device according to a sixth embodiment of the present invention.

According to a sixth embodiment shown in FIG. 17, a belt holder case 9 is angularly movable to a rear limit angular position which is substantially aligned with the side of the seat back 3 near a position under the center pillar of the automobile body. With this arrangement, passengers can easily get on and off rear seats particularly in four-door automobiles. The belt holder case 6 may be driven by the same arrangement as those employed in the prior embodiments.

In summary, as shown by each of the side views of FIGS. 6, 12 and 17 of the embodiments of this invention, the portion of the seat belt 6 extending from the hanger 8 to the end of the lever 9 in the forward position of the lever 9 has at least a substantial proportion thereof positioned in front of the seat back 3 and above the seat bottom 2 whereby a substantial space is defined between that portion of the seat belt 6, the front surface of the seat back 3 and the level 9 whereby the seat belt is available for convenient access to the occupant for manipulating the seat belt and connecting the tongue plate 12 to the buckle 11.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

What is claimed is:
1. A seat belt device for a seat of
  (a) a seat belt;
  (b) a retractor mounted on the inner wall of the vehicle body for winding up said seat belt;
  (c) a hanger mounted on the vehicle body and above said retractor;
  (d) a lever pivotally connected one end thereof to a part of the vehicle body and swingable in the back-and-forth direction with respect to the vehicle body;
  (e) said seat belt having a first end thereof coupled to said retractor, a second end thereof connected to a movable end of said lever, and an intermediate portion thereof loosely inserted through said hanger;
  (f) fastener means composed of a tongue plate carried between said second end and said intermediate portion on said seat belt, and a buckle attached on the opposite side of the seat from the lever;
  (g) drive means for driving said lever to move between a relatively forward first position and a relatively rearward second position;
  (h) said drive means being actuatable in response to opening and closing movement of the door such that said lever is prevented from moving into said first position unless the door is closed and from moving into said second position unless the door is open; and
  (i) the arrangement of the lever and seat being such that when said lever is in said first position, said movable end of said lever is located above an upper surface of the seat bottom, substantially forward of the entire front surface of the seat back, and below a straight line passing through a front end of the upper surface of the seat bottom and an upper end of the front surface of the seat back for positioning at least a substantial proportion of the intermediate portion of the seat belt that extends between the hanger and the lever movable end both above the seat bottom and forward of the front of the seat back, as viewed from a lateral side of the seat, for convenient access to the seat belt and tongue plate by an occupant of the seat for fastening the seat belt by connecting the tongue plate to the buckle.

2. A seat belt device according to claim 1, wherein said drive means comprises a door switch adapted to be switched in response to opening and closing movement of the door, first and second limit switches adapted to be switched when said lever is moved into said first and second positions, respectively, and a motor adapted to be controlled by said door switch and said first and second limit switches.

3. A seat belt device according to claim 2, wherein said drive means further comprises a buckle switch adapted to be switched in response to engagement between said tongue plate and said buckle, and said buckle switch is adapted to cooperate with said door switch for controlling said motor.

4. A seat belt device according to claim 2, including a mechanism for interlocking said lever and said door with each other.

5. A seat belt device according to claim 4, wherein said mechanism comprises a control wire, and said control wire and said lever are interconnected with each other through a damper mechanism.

6. A seat belt device according to claim 2, wherein said lever lies substantailly at the level of the floor of the vehicle when said lever is in said second position.

7. A seat belt device according to claim 2, wherein said lever stands substantially vertically at the place substantially under the center pillar of the vehicle when said lever is in said second position.

8. A seat belt device according to claim 4, wherein said lever lies substantially at the level of the floor of the vehicle when said lever is in said second position.

9. A seat belt device according to claim 4, wherein said lever stands substantially vertically at the place substantially under the center pillar of the vehicle when said lever is in said second position.

10. A seat belt device for a seat including
(a) a seat belt;
(b) a retractor mounted on the inner wall of the vehicle body for winding up said seat belt;
(c) a hanger mounted on the vehicle body and above said retractor;
(d) a lever pivotally connected one end thereof to a part of the vehicle body and swingable in the back-and-forth direction with respect to the vehicle body;
(e) said seat belt having a first end thereof coupled to said retractor, a second end thereof connected to a movable end of said lever, and an intermediate portion thereof loosely inserted through said hanger;
(f) fastener means composed of a tongue plate carried between said second end and said intermediate portion on said seat belt, and a buckle attached on the opposite side of the seat from the lever;
(g) drive means for driving said lever to move between a relatively forward first position and a relatively rearward second position;
(h) said lever in said first position extending forwardly and upwardly at an oblique angle;
(i) said drive means being actuatable in response to opening and closing movement of the door such that said lever is prevented from moving into said first position unless the door is closed and from moving into said second position unless the door is open; and
(j) the arrangement of the lever and seat being such that when said lever is in said first position, a portion of said seat belt that extends from said movable end of said lever to said hanger is located, when viewed from laterally of said seat, above an upper surface of the seat bottom, forward of substantially the entire front surface of the seat back by a substantial amount, and below a straight line passing through a front end of the upper surface of the seat bottom and an upper end of the front surface of the seat back, whereby a substantial space is defined among said portion of said seat belt, the front surface of the seat back, and the lever for convenient access to the seat belt and tongue plate by an occupant of the seat for fastening the seat belt by connecting the tongue plate to the buckle.

11. A seat belt device according to claim 10, wherein said drive means comprises a door switch adapted to be switched in response to opening and closing movement of the door, first and second limit switches adapted to be switched when said lever is moved into said first and second positions, respectively, and a motor adapted to be controlled by said door switch and said first and second limit switches.

12. A seat belt device according to claim 11, wherein said drive means further comprises a buckle switch adapted to be switched in response to engagement between said tongue plate and said buckle, and said buckle switch is adapted to cooperate with said door switch for controlling said motor.

13. A seat belt device according to claim 10, including a mechanism for interlocking said lever and said door with each other.

14. A seat belt device according to claim 13, wherein said mechanism comprises a control wire, and said control wire and said lever are interconnected with each other through a damper mechanism.

15. A seat belt device according to claim 11, wherein said lever lies substantially at the level of the floor of the vehicle when said lever is in said second position.

16. A seat belt device according to claim 11, wherein said lever stands substantially vertically at the place substantially under the center pillar of the vehicle when said lever is in said second position.

17. A seat belt device according to claim 13, wherein said lever lies substantially at the level of the floor of the vehicle when said lever is in said second position.

18. A seat belt device according to claim 13, wherein said lever stands substantially vertically at the place substantially under the center pillar of the vehicle when said lever is in said second position.

* * * * *